(12) United States Patent
Godowski et al.

(10) Patent No.: US 10,938,843 B2
(45) Date of Patent: *Mar. 2, 2021

(54) DETECTION OF FORBIDDEN SOFTWARE THROUGH ANALYSIS OF GUI COMPONENTS

(71) Applicant: International Business Machines Corporation, Armonk, NY (US)

(72) Inventors: Piotr P. Godowski, Cracow (PL); Bartlomiej T. Malecki, Slomniki (PL); Krzysztof Pienkowski, Cracow (PL); Artur K. Zezula, Skawina (PL)

(73) Assignee: International Business Machines Corporation, Armonk, NY (US)

( * ) Notice: Subject to any disclaimer, the term of this patent is extended or adjusted under 35 U.S.C. 154(b) by 26 days.

This patent is subject to a terminal disclaimer.

(21) Appl. No.: 16/515,350

(22) Filed: Jul. 18, 2019

(65) Prior Publication Data

US 2019/0342310 A1 Nov. 7, 2019

Related U.S. Application Data

(63) Continuation of application No. 15/452,248, filed on Mar. 7, 2017, now Pat. No. 10,367,833.

(51) Int. Cl.
*G06F 21/56* (2013.01)
*H04W 12/12* (2009.01)
(Continued)

(52) U.S. Cl.
CPC .......... *H04L 63/1416* (2013.01); *G06F 21/52* (2013.01); *G06F 21/564* (2013.01); *H04L 63/0281* (2013.01)

(58) Field of Classification Search
CPC . H04L 63/1416; H04L 63/0281; G06F 21/52; G06F 21/564; G06F 21/56; G06F 21/50; H04W 12/12

See application file for complete search history.

(56) References Cited

U.S. PATENT DOCUMENTS 8,468,502 B2 * 6/2013 Lui ..................... G06F 11/3636
717/127
9,071,639 B2 6/2015 Yamamura et al.
(Continued)

FOREIGN PATENT DOCUMENTS

CN 103917981 A 7/2014
JP 2012118857 A 6/2012

OTHER PUBLICATIONS

"List of IBM Patents or Patent Applications Treated as Related", Jul. 18, 2019, 2 pages.

(Continued)

*Primary Examiner* — Jung W Kim
*Assistant Examiner* — Howard H. Louie
(74) *Attorney, Agent, or Firm* — Francis Hammes; Stephen J. Walder, Jr.; Jeffrey S. LaBaw

(57) ABSTRACT

A mechanism is provided for controlling execution of a computer program. An execution of unallowed software may be prohibited. Structural elements of a graphical user interface of the computer program are detected. The detected structural elements are compared with a stored signature, each signature comprising structural elements of a graphical user interface of allowed computer programs. Upon not finding a matching signature among the stored signatures when comparing, further executing of the computer program is inhibited.

17 Claims, 8 Drawing Sheets

(51) Int. Cl.
*G06F 21/50* (2013.01)
*H04L 29/06* (2006.01)
*G06F 21/52* (2013.01)

(56) References Cited

U.S. PATENT DOCUMENTS

| | | | | |
|---|---|---|---|---|
| 9,197,663 | B1* | 11/2015 | Gilbert | H04L 63/20 |
| 9,213,463 | B2* | 12/2015 | Freedman | G06F 3/04817 |
| 10,089,095 | B2* | 10/2018 | Giri | G06F 3/04842 |
| 2002/0124185 | A1 | 9/2002 | Caspi | |
| 2004/0031030 | A1* | 2/2004 | Kidder | G06F 1/14 |
| | | | | 717/172 |
| 2006/0101277 | A1 | 5/2006 | Meenan et al. | |
| 2006/0253705 | A1* | 11/2006 | Roberts | G06F 21/52 |
| | | | | 713/168 |
| 2009/0104954 | A1* | 4/2009 | Weber | G07F 17/3223 |
| | | | | 463/1 |
| 2016/0098551 | A1* | 4/2016 | Seema | G06F 21/36 |
| | | | | 726/7 |
| 2017/0004305 | A1* | 1/2017 | Zakorzhevsky | G06F 21/56 |

OTHER PUBLICATIONS

"Inspect", Microsoft, https://msdn.microsoft.com/en-us/library/windows/desktop/dd318521%28v=vs.85%29.aspx, retrieved from the Internet Sep. 6, 2016, 6 pages.

"8 ways to reduce unauthorized software", (ISC)2 Government Advisory Council Executive Writers Bureau, Media, Inc., GCN, https://gcn.com/articles/2014/11/17/8-steps-reducing-unauthorized-software.aspx, Nov. 17, 2014, 4 pages.

"Remove Blacklisted Software Automatically", Zoho Corporation, ManageEngine.com, https://www.manageengine.com/products/desktop-central/prohibited-software.html, (month unknown) 2016, 2 pages.

"SwingInspector 1.2.2 (beta7) for Windows / Mac OS X / Linus", SwingInspector, http://www.swinginspector.com/index_en.htm, retrieved from the internet Sep. 6, 2016, 7 pages.

Dietrich, Christian J. et al., "Exploiting Visual Appearance to Cluster and Detect Rogue Software", ACM, http://www.christian-rossow.de/publications/visualmalware-SAC2013.pdf, SAC'13, Coimbra, Portugal, Mar. 18-22, 2013, 8 pages.

Weiss, Josef, "Inventory Authorized and Unauthorized Software", Tenable Network Security, https://www.tenable.com/sc-dashboards/inventory-authorized-and-unauthorized-software, May 27, 2016, 3 pages.

* cited by examiner

430 

```
Sample XML description of UI - gathered list of UI components of application
with their hierarchy:

<Window name="MiniGet" ...>
<Menu>
   <MenuItem name="File" ...>...</Menuitem>
   <MenuItem name="Language" ...>...</Menuitem>
   <MenuItem name="Tools" ...>...</Menuitem>
   <MenuItem name="Help" ...>...</Menuitem>
</Menu>
   <Toolbar>
      <Button icon=".." tooltip="..." .../>
      <Button icon=".." tooltip="..." .../>
      <Button icon=".." tooltip="..." .../>
      <Button icon=".." tooltip="..." .../>
      <Button icon=".." tooltip="..." .../>
   </Toolbar>
<Pane>
       <TreeView .../>
       <HeaderList ...>
            <Column name="File Name" .../>
            <Column name="Size" .../>
            <Column name="Progress" .../>
            ...
       </HeaderList>
</Pane>
</Windows>
```

```
Sample UI Signature in XML notation:

<Signature>
<and>
    <hascomponent class="Menu">
        <componentchildren count=4/>
    </hascomponent>
    <hascomponent class="Toolbar">
        <componentchildren count=5/>
    </hascomponent>
    <hascomponent class="Pane">
        <hascomponent class="TreeView"/>
        <hascomponent class="HeaderList">
        <hascomponent class="Column" name="File Name"/>
        </hascomponent>
    </hascomponent>
<and>
</Signature>
```

FIG. 4d

DETECTION OF FORBIDDEN SOFTWARE THROUGH ANALYSIS OF GUI COMPONENTS

BACKGROUND

The invention relates generally to a computer-implemented method for controlling execution of a computer program, and more specifically, to inhibiting the execution of unallowed software programs. The invention relates further to a system for controlling execution of a computer program, and a related computer program product.

In enterprise computing networks, security is a big issue these days. Enterprise IT (information technology) departments often use software asset management tools in order to scan and control execution of programs on end point systems, such as servers, personal computers and mobile devices. Typically, guidelines and governance rules exist in order to differentiate between allowed and unallowed or not allowed software programs on such endpoints. Thus, to ensure security of corporate networks, systems and computing environments, administrators often forbid installing and using untested or unwanted software which may have the potential for security breaches. Conventional systems often use a detection of such un-allowed software based on file names. However, even file name hash values or hash values of computer programs might be overcome easily by changing the name of the un-allowed software program or by adding some extra bytes at the end of the file. It may also be noted that not all software, installed on a network end-point, might be visible in a software registry. This is especially problematic if the software may be altered/recompiled to change related security keys.

Several state-of-the-art techniques try to address this problem, however, in an unsatisfactory way.

Document US 2006/0101277 A1 discloses to protect the client system from unauthorized programs. This is performed by a scanner application for detecting particular unauthorized programs on a host system which may periodically be provided to a client system that executes the scan application.

Also, the document US 2002/0124185 A1 discloses methods and systems for detecting unauthorized software. These methods and systems operate by querying domain name servers for data, representative of software and the machine/computer of a user employing the software. If the data representative of the software and the machine employing the software is detected in a packetized transmission, it is extracted and compared against previously stored data. Based on this, an authorization status is determined.

However, the solutions do not overcome the problem described above, i.e., altering the code a little bit but still perform the same unallowed functionality.

Hence, there may be a need to make an installation of unallowed software programs, as well as hiding known but unwanted applications on computers, significantly harder.

SUMMARY

According to one aspect of the present invention, a computer-implemented method for controlling execution of a computer program may be provided. The controlling of the execution may be performed upon being executed on a computer system. The method may comprise detecting structural elements of a graphical user interface of the computer program and comparing the detected structural elements with a stored signature. Each signature may comprise structural elements of a graphical user interface of allowed computer programs. Upon not finding a matching signature among the stored signatures when comparing, the execution of the computer program may be inhibited.

According to another aspect of the present invention, a system for controlling execution of a computer program upon the computer program being executed on a computer system may be provided. The system may comprise a detection unit adapted for detecting structural elements of a graphical user interface of the computer program and a comparison module adapted for comparing the detected structural elements with a stored signature. Also here, each signature may comprise structural elements of a graphical user interface of allowed computer programs.

The system may also comprise an inhibiting unit adapted for inhibiting a further executing of the computer program, upon not finding a matching signature among the stored signatures when comparing.

The proposed computer-implemented method for controlling execution of a computer program may offer multiple advantages and technical effects:

The proposed concept does not rely only on software signatures as known today, i.e., name of files, name of directories, related hash values or traditional software signatures. Instead, the detection relies more and/or additionally to traditional methods on the functionality of the software program which may not be allowed on the computer system. Because the functionality may typically be expressed by the appearance of the graphical user interface (GUI) of the software program, the proposed concept may generate a software program signature based on the appearance of the graphical user interface. Such a GUI interface is much harder to change for a classical user. Although software programs may allow—in some cases—to alter the appearance of the GUI, the number of general options is limited. This is because the number of program options may not be reduced when changing the appearance of the GUI.

By using structural elements of the GUI, like quantity, attributes—e.g., type, name, etc.—and hierarchies, a more or less unique fingerprint or signature may be generated from such an analysis of GUI elements. The barrier to install unallowed software according to security and architectural enterprise guidelines may become much harder. As a consequence, those software programs with the potential to compromise enterprise computing systems—like a chat program or a file sharing program—may be excluded from running in a corporate IT environment.

As a further consequence of the detection, the unallowed programs may be halted, terminated or paused. A user may take appropriate action. An administrator or a supervising program—such as a software asset management tool (SAM)—may also be informed or notified.

It has been proven that the here proposed concept is more resilient to end user actions to prevent not allowed software in enterprise networks (or elsewhere) to be detected and reported to the system administrator. This is because a GUI of a software program is much harder to change for a typical end user, especially if compared to classical attributes used by software signatures as known today.

In the following, additional embodiments of the inventive concept will be described:

According to one advantageous embodiment of the method, the detecting the structural elements may comprise using different proxy libraries for different operating systems and user interface technologies and generating a signature based on the structural elements. The signature may be independent from the operating system and the used user interface (UI) technology. This way, a variety of different implementation options may be captured. Additionally, the proxy libraries may also reflect different GUI skins of the application. That way, also un-allowed software programs coming in a classic or a modern style may be detected.

According to an additionally preferred embodiment of the method, the user interface technology may comprise at least one out of the group comprising a native—i.e., proprietary—user interface, a Java user interface and a WebUI/HTML UI, i.e., Web user interface and/or HyperText Markup Language in any of the known versions, including but not limited to HTML4, HTML5 or higher versions.

According to one further advantageous embodiment of the method, the signature may be expressed in a document object model (DOM) syntax. Thus, the signature may be independent of an underlying computing environment—i.e., operating system and/or GUI technology—and it may be expressed as a tree of nodes, wherein each node may express a portion of the GUI of the software program. This may make the proposed technology platform independent.

According to one further advantageous embodiment of the method, the structural elements may comprise at least one out of the group comprising structure and number of elements of the graphical user interface window—e.g., sub-windows—number and type of menu items—e.g. icons or line items—structure and number of elements of a toolbar, a window name, a used library by the computer program—e.g., Direct X—a header name of a sub-window, a number of sub-windows, color attribute and used font(s). Basically, the analysis may be directed to any structural element of a GUI. If helpful for a complex GUI implementation, a pattern recognition engine may be deployed to detect the structural elements.

It may be noted that the use of the Direct X library may be a strong indication that the application may be graphic intensive. This is often the case for games which may generally not be acceptable as an enterprise application.

That way, a cascaded set of analysis tools which grow in sophistication and complexity may be deployed for the detection and signature comparison. Implementing such a technology, simple GUI structures may be detected using comparably simple detection tools, while complex GUI structures may only be detected with complex detection tools—i.e., a pattern recognition engine. That way, only those computing resources may be used for the detection representing a minimal performance implication for other software programs.

According to one permissive embodiment of the method, the detecting structural elements may be independent from the status of the computer program. The status may, e.g., be active or passive. I.e., the related GUI window may be the active window on a computer screen, it may be in the background on the computer screen, or the GUI window may even be displayed in a minimized version. In any case, the detecting structural elements may be achievable. This may be performed by analyzing the memory representation of the GUI in the computer memory or by analyzing the structure of the instructions causing the display of the software program related window. Hence, the unallowed software program may be hidden by setting its status to inactive or by minimizing the window in the GUI of the operating system.

According to one optional embodiment of the method, the detecting may also comprise detecting structural elements in all active windows in the graphical user interface of the computer system. However, also passive windows may be reflected in the detecting. As a consequence, there may be no way to escape the scanning process for unallowed software program on a computer system.

Alternatively, and according to one additionally permissive embodiment of the method, the detecting may also comprise detecting structural elements in all active processes in the computer system. This approach may go beyond the alternative approach described in the paragraph before. That way, all potential programs with GUI elements may be analyzed. The processes may be active or passive. Whenever a related software scan program may detect a process running on a computer, a related GUI element may be analyzed for un-allowed GUI signatures. This may enhance the chance to detect and potentially inhibit execution of unallowed program on a computer.

A further preferred embodiment of the method may also comprise generating a signature for a computer program only if a window complexity factor is above a pre-defined threshold value. Because simple GUI windows of different programs—allowed and unallowed—may only differ insignificantly, only those unallowed software programs may be execution-inhibited that have a minimum complexity and thus, a minimum of differentiating features. Such a complexity factor may also reflect sub-window nesting. Unique, expressive names of GUI windows may increase the complexity factor. Other generic names—like, e.g., "main menu"—may decrease the complexity factor.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Figure 1:
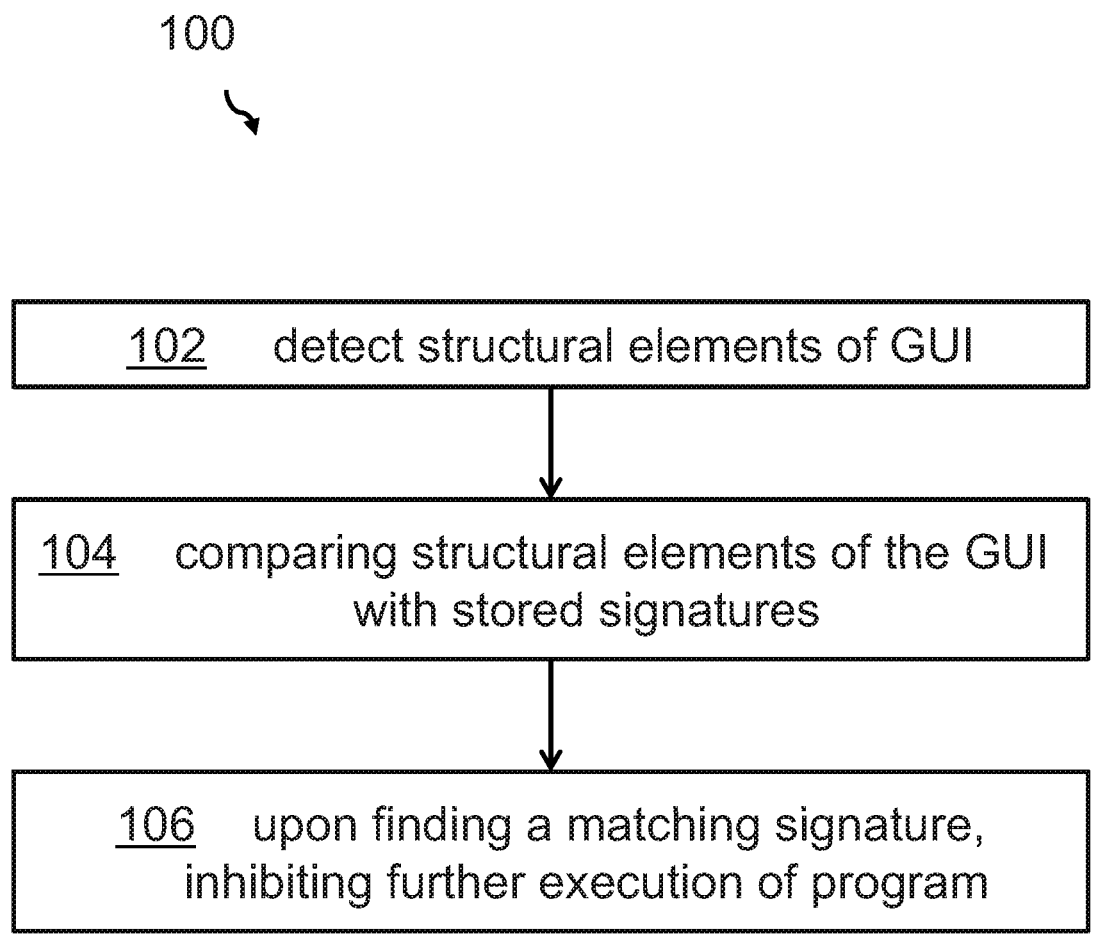

Preferred embodiments of the invention will be described, by way of example only, and with reference to the following drawings:

FIG. 1 shows a block diagram of an embodiment of the inventive computer-implemented method for controlling execution of a computer program.

Figure 2:
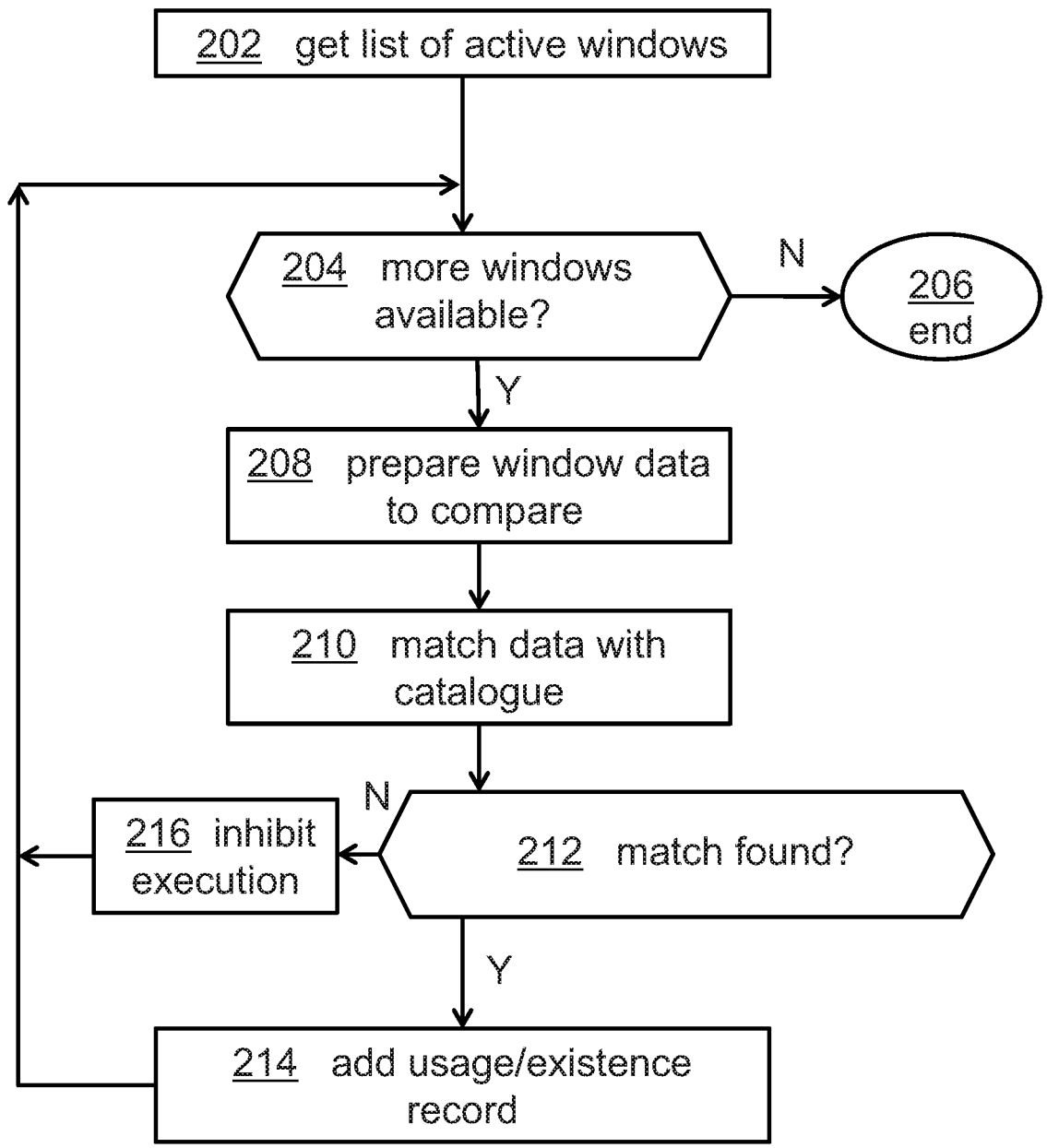

FIG. 2 shows a block diagram of an embodiment of a more detailed flowchart of the proposed concept.

Figure 3:
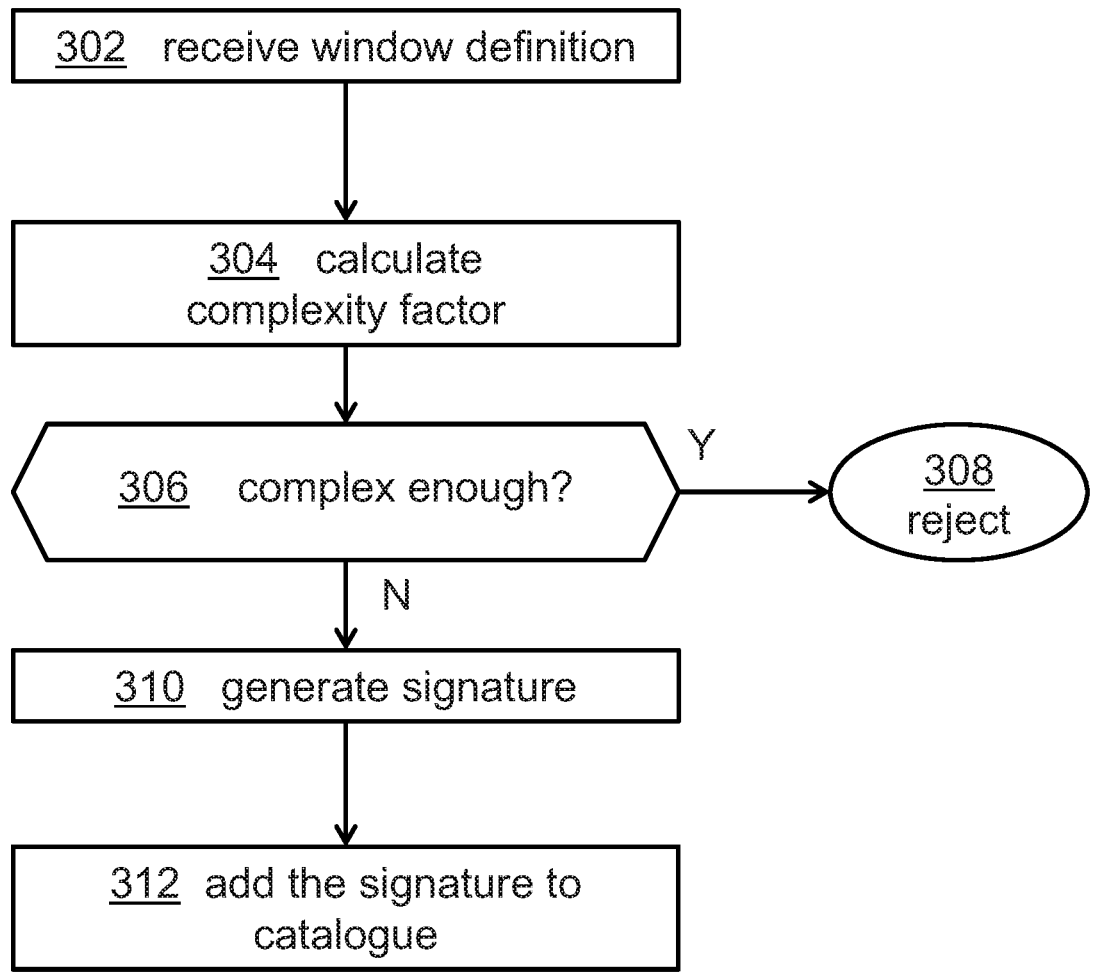

FIG. 3 shows a block diagram of an embodiment of a flowchart of a generation of a signature.

Figure 4A:
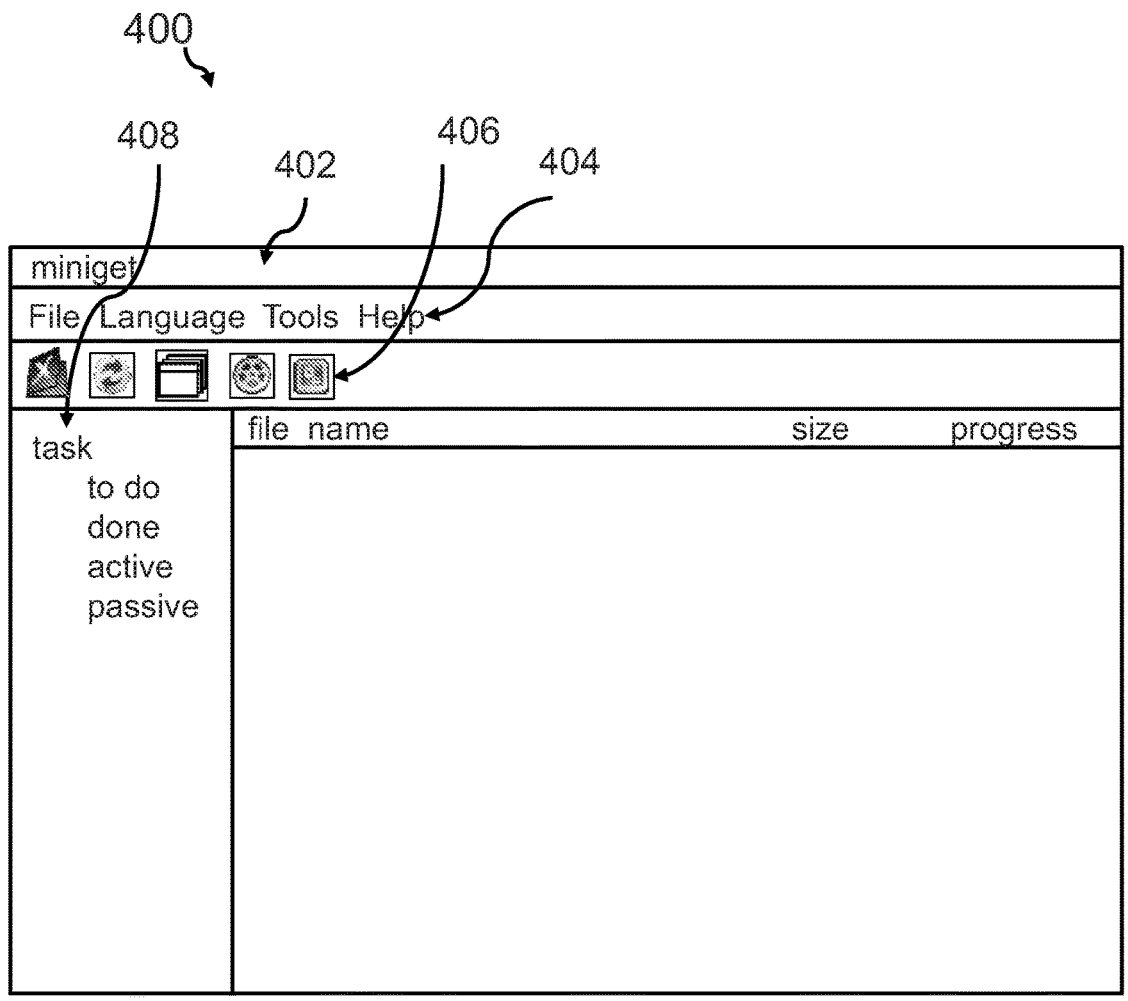

FIG. 4a shows an example of a GUI representation.

Figure 4B:
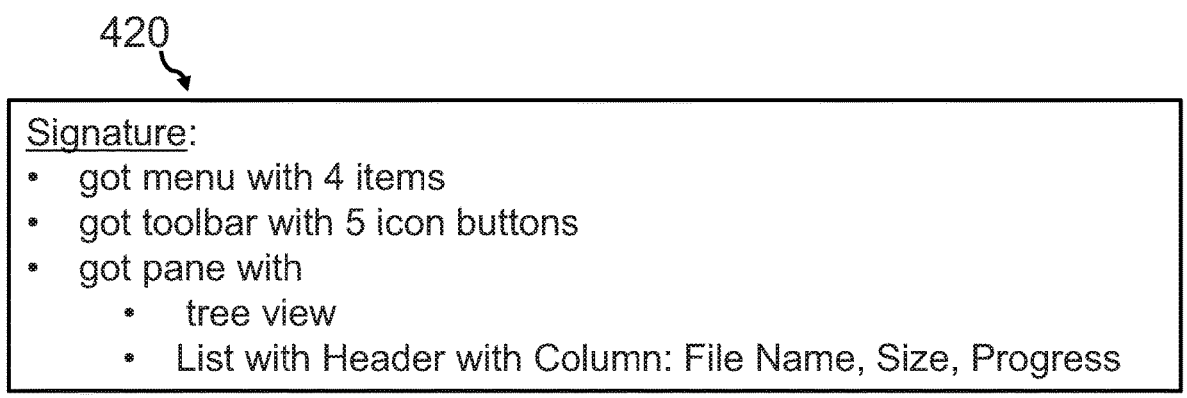

FIG. 4b shows a signature in natural language for the GUI representation of FIG. 4a.

FIG. 4c shows a sample XML description of the GUI representation of FIG. 4a.

FIG. 4d shows the GUI representation of FIG. 4a in XML notation.

Figure 5:
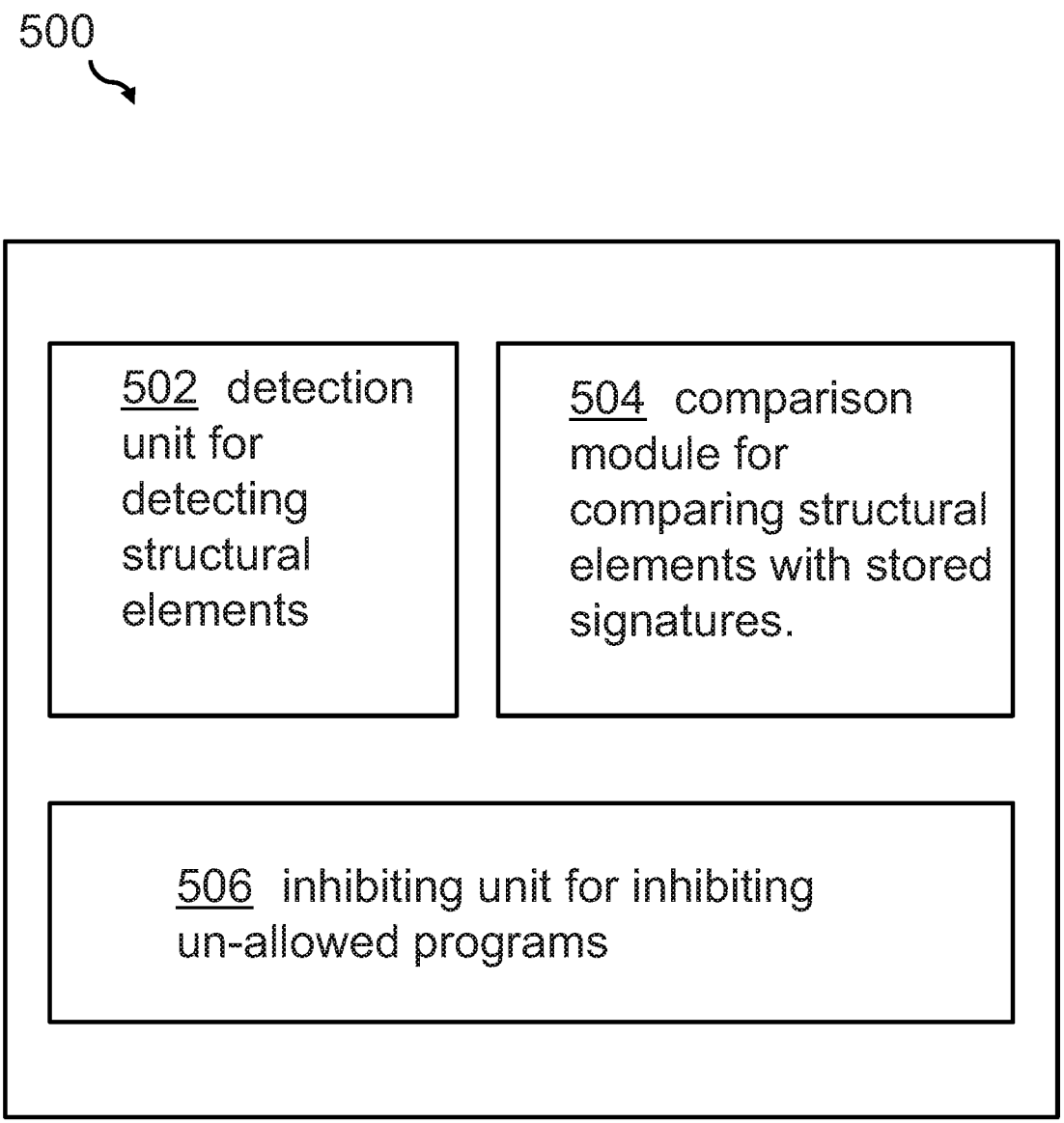

FIG. 5 shows a block diagram of an embodiment of the system for controlling execution of a computer program.

Figure 6:
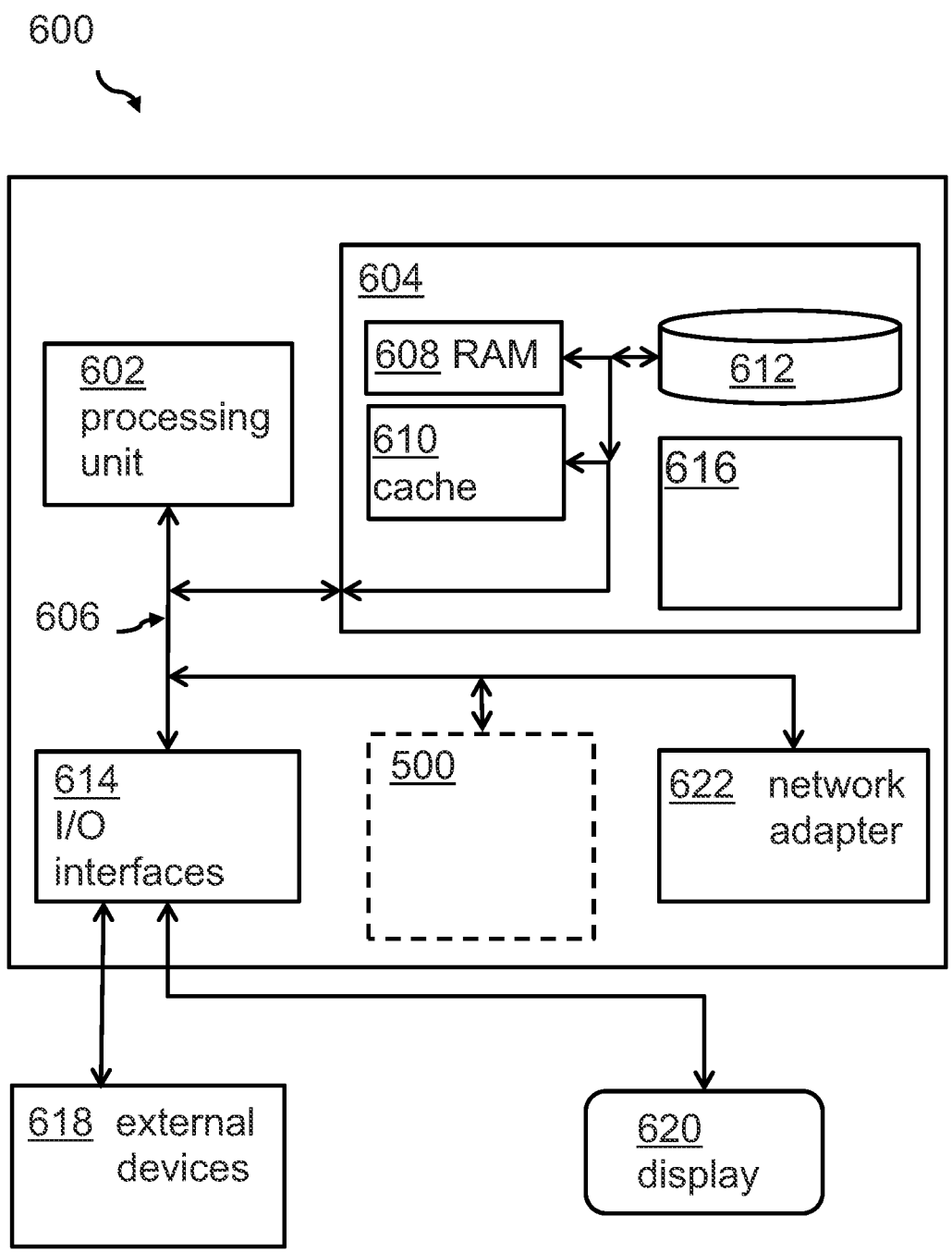

FIG. 6 shows an embodiment of a computing system comprising the system for controlling execution of a computer program.

DETAILED DESCRIPTION

In the context of this description, the following conventions, terms and/or expressions may be used:

The term 'structural elements' may denote potentially each programmable or displayable item, icons, text, menu option, line item, hierarchy and/or related elements, selectable button or option displayed in a window of a graphical user interface of a computer screen or its related data representation in form of a describing data structure representing the content of the related GUI window. Additionally, all attributes of the structural element may be counted as an option for a structural element. Hence, not only the element itself is counted as structural element but also its appearance.

The term 'graphical user interface' may denote a type of user interface that allows users to interact with electronic devices through graphical icons and visual indicators such as secondary notation, instead of text-based user interfaces, typed command labels or text navigation. The actions in a GUI are usually performed through direct manipulation of the graphical elements. Besides computers, GUIs may also be used in many handheld mobile devices such as MP3 players, portable media players, gaming devices, smartphones and smaller household devices, office and industrial controls. For the functioning of the here proposed solution, the kind of used GUI toolkit for designing and generating the GUI is irrelevant. Any toolkit may be used. Examples include, C++ language based toolkits, Objective Pascal based toolkits, C language based toolkits, Objective-C-based toolkits, Ruby-based toolkits and Java-based toolkits. No exemptions need to be made because the proposed solution does make use of any of the functions of the GUI toolkit but looks at the resulting dialog window, i.e., the graphical/textual appearance of the dialog window of the resulting application at runtime.

The term 'GUI signature' may denote a data structure describing characteristic elements of a user interface of a software program. The GUI signature may be expressed, e.g., an XML notation or any comparable data structure. The GUI signature may be generated out of dedicated and detectable structural elements of the displayed window of the GUI. It may be based on the number, internal or external structure, relationships to each other and/or attributes of the structural elements.

It may also be noted that a GUI signature may be related to one window/one dialog of an application. However, an application may comprise a plurality of dialog windows. Consequently, also a plurality of GUI signatures may exist for a given allowed application. These GUI signatures may be grouped to identify the same underlying application. Additionally, a compound GUI signature for an allowed application may be generated based on a predefined set of generation rules. Such a compound GUI may be a simple group-wise combination of individual GUI signatures of the individual application dialog windows. It may also be possible to view raw versions of the different GUI signatures as matrix elements of a GUI signature matrix associated to an allowed application.

The term 'document object model' (DOM) may denote a cross-platform and language-independent application programming interface that may treat an HTML, XHTML, or XML document as a tree structure, wherein each node may be an object representing a part of the document. The objects may be manipulated programmatically and any visible changes occurring as a result may then be reflected in the display of the document. The Principal standardization of DOM was handled by the W3C (World Wide Web Consortium), which last developed a recommendation in 2004. WHATWG (Web Hypertext Application Technology Working Group) took over development of the standard, publishing it as a living document. The W3C now publishes stable snapshots of the WHATWG standard.

The term 'inhibiting', in particular inhibiting the execution of an execution of a software program, may denote that a software program—in particular an unallowed software program—be prohibited from execution. Alternative expressions may comprise stopped, paused, hibernated, blocked or killed. Although, the just listed alternatives denote technically different concepts, they all have as consequence that the related software program may not be executed.

The term 'complexity factor' may denote a numerical value representing the structure of a displayable GUI. The more complex in terms of structure and elements the GUI is, the higher the complexity factor may be. The complexity factor may—in a simple example—be the number of GUI components. Alternatively, a complexity factor vector may be generated first, wherein each dimension comprises the number of type of GUI element (e.g., all icons, all text options, all hierarchies, . . . ). Now, as complexity factor, the mathematical length of the complexity factor vector may be used. Different dimensions of the complexity factor vector may have additional weighing factors, increasing or decreasing the importance of a certain type of GUI element before a final complexity factor is calculated.

In the following, a detailed description of the figures will be given. All instructions in the figures are schematic. Firstly, a block diagram of an embodiment of the inventive computer-implemented method for controlling execution of a computer program is given. Afterwards, further embodiments, as well as embodiments of the system for controlling execution of a computer program, will be described.

FIG. 1 shows a block diagram of an embodiment of the computer-implemented method 100 for controlling execution of a computer program when the computer program is executed on a computer system. The method 100 comprises detecting, 102, structural elements of a graphical user interface of the computer program and comparing, 104, the detected structural elements with a stored signature, in particular, a program GUI signature. In practical cases, a plurality of GUI signatures for different allowed programs may be used. Each signature comprises structural elements of a graphical user interface of allowed computer programs. Consequently, for unallowed software programs no GUI signatures may exist.

Upon not finding, 106, a matching signature among the stored signatures during the comparing process, the related computer program is inhibited for a further execution. Thus, those programs for which no GUI signature exists, will not be executed, i.e., an execution is inhibited.

FIG. 2 shows a block diagram of an embodiment of a more detailed flowchart 200 of the proposed concept. The process flow starts with getting, 202, a list of active GUI windows. If it may be determined that the last window in the GUI has been reached (204, "more windows available?") the process ends, 206. Otherwise, the window data to be rendered will be prepared, 208, for a comparison with GUI signatures. This match will happen in step 210. If a match is found in the related determination 212—case "yes"—a record describing a usage of allowed software may be added, 214, to a repository potentially.

In case of "no" of the determination 212, the process inhibits, 216, the execution of the software program for which no GUI signature exists and returns the execution to the determination whether more windows are available, 204, and repeats the process in the loop.

FIG. 3 shows a block diagram of an embodiment of a flowchart 300 of a generation of a signature. Firstly, a window definition for a GUI of an allowed software program may be received, 302. The complexity factor is calculated, 304. The GUI signature may only be used for if the complexity factor exceeds a predefined threshold value. In case this threshold value may not be reached or exceeded (compare determination 306), the calculation of a GUI signature may be rejected, 308. In the other case—i.e., the complexity is high enough—the GUI signature is generated, 310, and the generated GUI signature is added, 312, to a catalog of allowed software components in a normalized form. The GUI signatures may be managed under control of a software asset management tool.

As a simple example of a complexity factor, the number of GUI elements may be used. However, the complexity factor may also follow a more sophisticated calculation method. Generally, the complexity factor is used in order to prevent false positive detections because of a too generic or simple dialog window.

FIG. 4a shows an example of a GUI representation in form of a window 400. In a name field 402, the name of the window may be displayed; here, the name "miniget" is used. The displayed window shows for selectable options 404: "file", "language", "to its" and "help". Additionally, five selectable icons 406 are displayed. Furthermore, a sub window 408 with a displayed hierarchy is shown. Moreover, beside this hierarchy window, another window displaying a potential list of file names, related sizes and a progress indicator for each line is displayed.

The complexity factor of such a displayed user interface may be calculated as a function of the displayed icons, hierarchies, sub-windows, selectable options and/or any other displayable element.

FIG. 4b shows a signature 420 in natural language for the GUI representation of FIG. 4a. This is nothing more than a single-structured summary of the two paragraphs above.

FIG. 4c shows a sample XML description 430 of the GUI representation of FIG. 4a. Here, all rules and available language elements of XML have been reflected. Thus, a completely structured version of the GUI is available herewith.

FIG. 4d shows the GUI signature 440 of FIG. 4a in XML notation. Based on the XML description 430 of the GUI representation of FIG. 4c, a clearly structured and compact GUI signature may be generated. A skilled person may be able to interpret the XML language constructs.

FIG. 5 shows a block diagram of an embodiment of the system 500 for controlling execution of a computer program. This is done upon the computer program being executed on a computer system. The system comprises a detection unit 502 adapted for detecting structural elements of a graphical user interface of the computer program and a comparison module 504 adapted for comparing the detected structural elements with a stored signature, each signature comprising structural elements of a graphical user interface of allowed computer programs. Furthermore, the system comprises an inhibiting unit 506 adapted for inhibiting a further—or initial—execution of the computer program, upon not finding a matching signature among the stored signatures when comparing. That way, programs representing a certain risk to the full functionality of a computer system or a complete computing environment may either be stopped immediately or the execution may be prohibited altogether.

Embodiments of the invention may be implemented together with virtually any type of computer, regardless of the platform being suitable for storing and/or executing program code. FIG. 6 shows, as an example, a computing system/server 600 suitable for executing program code related to the proposed method.

The computing system/server 600 is only one example of a suitable computer system and is not intended to suggest any limitation as to the scope of use or functionality of embodiments of the invention described herein. Regardless, computer system/server 600 is capable of being implemented and/or performing any of the functionality set forth hereinabove. In the computer system/server 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system/server 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 600 is shown in the form of a general-purpose computing device. The components of computer system/server 600 may include, but are not limited to, one or more processors or processing units 602, a system memory 604, and a bus system 606 that couples various system components including system memory 604 to the one or more processors or processing units 602. Bus system 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus system 606 by one or more data media interfaces. As will be further depicted and described below, system memory 604 may include at least one program product having a set (e.g., at least one) of program modules that are configured to carry out the functions of embodiments of the invention.

The program/utility, having a set (at least one) of program modules 616, may be stored in system memory 604 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus system 606. It should be understood that although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the system 500 for controlling execution of a computer program may be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an objectoriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for controlling execution of a computer program, upon the computer program being executed on a computer system, the method comprising:
    detecting structural elements of a graphical user interface of the computer program, the structural elements of the graphical user interface of the computer program comprising one or more of a number of menu items in the graphical user interface, a type of each menu item in the graphical user interface, a structure of elements of a toolbar of the graphical user interface, or a number of elements of the toolbar of the graphical user interface;
    comparing the detected structural elements with each signature of a set of stored signatures, each signature comprising the structural elements of a graphical user interface of allowed computer programs, wherein each signature of the set of stored signatures is generated based on the structural elements of the graphical user interface of an associated allowed computer program by the method comprising:
        generating a value based on weighted values for the structural elements of the graphical user interface of the associated allowed computer program;
        comparing the value to a predefined threshold value;
        responsive to the value exceeding the predefined threshold value, generating the signature; and
        responsive to the value failing to exceed the pre-defined threshold value, rejecting the generation of the signature; and upon failing to find a matching signature among the set of stored signatures when comparing, inhibiting further executing of the computer program.

2. The method according to claim 1, further comprising a user interface technology comprises at least one out of the group comprising a native user interface, Java interface, and a WebUI/HTML interface.

3. The method according to claim 1, wherein each signature of the set of stored signatures is expressed in a document object model.

4. The method according to claim 1, wherein the structural elements of the graphical user interface of the computer program further comprises one or more of a structure of elements of a graphical user interface window of the graphical user interface of the computer program, a number of elements of the graphical user interface window of the graphical user interface of the computer program, a window name of the graphical user interface of the computer program, a header name of a sub-window of the graphical user interface of the computer program, a number of sub-windows of the graphical user interface of the computer program, a color attribute of the graphical user interface of the computer program, or a font used in the graphical user interface of the computer program.

5. The method according to claim 1, wherein the detecting the structural elements of the graphical user interface of the computer program is independent from a status of the computer program.

6. The method according to claim 1, wherein the detecting the structural elements of the graphical user interface of the computer program further comprises:
  detecting structural elements in all active windows in a respective graphical user interface of the computer system.

7. The method according to claim 1, wherein the detecting the structural elements of the graphical user interface of the computer program further comprises:
  detecting the structural elements in all active processes in the computer system.

8. A system for controlling execution of a computer program,
  a processor; and
  a memory coupled to the processor, wherein the memory comprises instructions which, when executed by the processor, cause the processor to:
  detect structural elements of a graphical user interface of the computer program, the structural elements of the graphical user interface of the computer program comprising one or more of a number of menu items in the graphical user interface, a type of each menu item in the graphical user interface, a structure of elements of a toolbar of the graphical user interface, or a number of elements of the toolbar of the graphical user interface;
  compare the detected structural elements with each signature of stored signatures, each signature comprising the structural elements of a graphical user interface of allowed computer programs, wherein each signature of the set of stored signatures is generated based on the structural elements of the graphical user interface of an associated allowed computer program by the instructions further causing the processor to;
    generate a value based on weighted values for the structural elements of the graphical user interface of the associated allowed computer program;
    compare the value to a predefined threshold value;
    responsive to the value exceeding the predefined threshold value, generate the signature; and
    responsive to the value failing to exceed there-defined threshold value, reject the generation of the signature; and
  upon failing to find a matching signature among the set of stored signatures when comparing, inhibit further executing of the computer program.

9. The system according to claim 8, wherein the user interface technology comprises at least one out of the group comprising a native user interface, Java interface, and a WebUI/HTML interface.

10. The system according to claim 8, wherein each signature of the set of stored signatures is expressed in a document object model.

11. The system according to claim 8, wherein the structural elements of the graphical user interface of the computer program further comprises one or more of a structure of elements of a graphical user interface window of the graphical user interface of the computer program, a number of elements of the graphical user interface window of the graphical user interface of the computer program, a window name of the graphical user interface of the computer program, a header name of a sub-window of the graphical user interface of the computer program, a number of sub-windows of the graphical user interface of the computer program, a color attribute of the graphical user interface of the computer program, or a font used in the graphical user interface of the computer program.

12. The system according to claim 8, wherein the instructions to detect the structural elements of the graphical user interface of the computer program are independent from a status of the computer program.

13. The system according to claim 8, wherein the instructions to detect the structural elements of the graphical user interface of the computer program further causes the processor to:
  detect structural elements in all active windows in a respective graphical user interface of the computer system.

14. The system according to claim 8, wherein the instructions to detect the structural elements of the graphical user interface of the computer program further causes the processor to:
  detect the structural elements in all active processes in the computer system.

15. A computer program product comprising a non-transitory computer readable storage medium having a computer readable program for controlling execution of a computer program stored therein, wherein the computer readable program, when executed on a computing device, causes the computing device to:
  detect structural elements of a graphical user interface of the computer program, the structural elements of the graphical user interface of the computer program comprising one or more of a number of menu items in the graphical user interface, a type of each menu item in the graphical user interface, a structure of elements of a toolbar of the graphical user interface, or a number of elements of the toolbar of the graphical user interface;
  compare the detected structural elements with each signature of a set of stored signature each signature comprising the structural elements of a graphical user interface of allowed computer programs, wherein each signature of the set of stored signatures is generated based on the structural elements of the graphical user interface of an associated allowed computer program by the computer readable program further causing the computing device to:

generate a value based on weighted values for the structural elements of the graphical user interface of the associated allowed computer program;

compare the value to a predefined threshold value;

responsive to the value exceeding the predefined threshold value, generate the signature; and responsive to the value failing to exceed the pre-defied threshold value, reject the generation of the signature; and upon failing to find a matching signature among the set of stored signatures when comparing, inhibit further executing of the computer program.

16. The method according to claim 1, wherein the structural elements of the graphical user interface of each allowed computer program further comprises one or more of a structure of elements of a graphical user interface window of the graphical user interface of the allowed computer program, a number of elements of the graphical user interface window of the graphical user interface of the allowed computer program, a window name of the graphical user interface of the allowed computer program, a header name of a sub-window of the graphical user interface of the allowed computer program, a number of sub-windows of the graphical user interface of the allowed computer program, a color attribute of the graphical user interface of the allowed computer program, or a font used in the graphical user interface of the allowed computer program.

17. The system according to claim 8, wherein the structural elements of the graphical user interface of each allowed computer program further comprises one or more of a structure of elements of a graphical user interface window of the graphical user interface of the allowed computer program, a number of elements of the graphical user interface window of the graphical user interface of the allowed computer program, a window name of the graphical user interface of the allowed computer program, a header name of a sub-window of the graphical user interface of the allowed computer program, a number of sub-windows of the graphical user interface of the allowed computer program, a color attribute of the graphical user interface of the allowed computer program, or a font used in the graphical user interface of the allowed computer program.

* * * * *